(12) United States Patent
Hassani et al.

(10) Patent No.: US 10,600,270 B2
(45) Date of Patent: Mar. 24, 2020

(54) BIOMETRIC AUTHENTICATION FOR A VEHICLE WITHOUT PRIOR REGISTRATION

(71) Applicant: Ford Global Technologies, LLC, Dearborn, MI (US)

(72) Inventors: Ali Hassani, Ann Arbor, MI (US); Aaron Matthew Delong, Toledo, OH (US); John Robert Van Wiemeersch, Novi, MI (US); James Gilpin, Huntington Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 260 days.

(21) Appl. No.: 15/688,624

(22) Filed: Aug. 28, 2017

(65) Prior Publication Data

US 2019/0066424 A1    Feb. 28, 2019

(51) Int. Cl.
| | | |
|---|---|---|
| *G07C 9/00* | (2020.01) | |
| *B60R 25/04* | (2013.01) | |
| *B60R 25/23* | (2013.01) | |
| *B60R 25/24* | (2013.01) | |
| *B60R 25/25* | (2013.01) | |
| *G07C 5/08* | (2006.01) | |

(52) U.S. Cl.
CPC .......... *G07C 9/00563* (2013.01); *B60R 25/04* (2013.01); *B60R 25/23* (2013.01); *B60R 25/24* (2013.01); *B60R 25/25* (2013.01); *B60R 25/252* (2013.01); *G07C 9/00857* (2013.01); *G07C 5/08* (2013.01); *G07C 2009/00412* (2013.01); *G07C 2009/00547* (2013.01); *G07C 2009/00888* (2013.01)

(58) Field of Classification Search
CPC ...... G07C 9/00563; G07C 2009/00888; B60R 25/04; B60R 25/23; B60R 25/25; B60R 25/252
See application file for complete search history.

(56) References Cited

U.S. PATENT DOCUMENTS

| | | | | |
|---|---|---|---|---|
| 8,344,849 | B2 * | 1/2013 | Larsson | B60R 25/25 |
| | | | | 340/426.11 |
| 8,890,654 | B2 * | 11/2014 | Van Wiemeersch | B60R 25/25 |
| | | | | 340/5.8 |
| 8,952,781 | B2 * | 2/2015 | Al-Azem | H04L 63/0861 |
| | | | | 340/5.52 |
| 9,242,619 | B2 * | 1/2016 | Choi | B60R 25/25 |

(Continued)

FOREIGN PATENT DOCUMENTS

| | | | | |
|---|---|---|---|---|
| EP | 2295298 A1 * | 3/2011 | ......... | B60R 25/2018 |
| EP | 2295298 A1 | 3/2011 | | |

*Primary Examiner* — Thomas E Worden
(74) *Attorney, Agent, or Firm* — Frank Lollo; Eversheds Sutherland (US) LLP

(57) ABSTRACT

Method and apparatus are disclosed for biometric authentication for a vehicle without prior registration. An example vehicle include a biometric scanner to generate a biometric token and a body control module. The body control module when the biometric token is authorized, enable san ignition switch. Additionally, when the biometric token is not authorized and an additional source of authorization is received, the body control module (a) tracks usage of the vehicle subsequent to receiving the biometric token, and (b) marks the biometric token as authorized when the usage satisfies a threshold.

20 Claims, 3 Drawing Sheets

(56) References Cited

U.S. PATENT DOCUMENTS

| | | | | |
|---|---|---|---|---|
| 9,440,658 | B2* | 9/2016 | Kalhous | B60R 25/25 |
| 2002/0183624 | A1* | 12/2002 | Rowe | A61B 5/117 |
| | | | | 600/476 |
| 2005/0077995 | A1* | 4/2005 | Paulsen | G07C 9/00039 |
| | | | | 340/5.6 |
| 2010/0060412 | A1* | 3/2010 | Johnson | B60R 25/04 |
| | | | | 340/5.53 |
| 2013/0145938 | A1* | 6/2013 | Correale, Jr. | B30B 9/3007 |
| | | | | 100/35 |
| 2013/0229259 | A1* | 9/2013 | Huang | G07C 9/00563 |
| | | | | 340/5.52 |
| 2014/0039721 | A1* | 2/2014 | Protopapas | G07C 9/00087 |
| | | | | 701/1 |
| 2014/0266623 | A1* | 9/2014 | Graumann | B60K 28/02 |
| | | | | 340/10.1 |
| 2016/0137163 | A1* | 5/2016 | Menard | B60H 1/00642 |
| | | | | 701/23 |
| 2016/0358389 | A1* | 12/2016 | Menard | G07C 9/00309 |
| 2017/0061110 | A1* | 3/2017 | Wright | G06F 21/32 |
| 2017/0080346 | A1* | 3/2017 | Abbas | A63F 13/825 |
| 2017/0334394 | A1* | 11/2017 | Menard | G07C 9/00309 |
| 2018/0103022 | A1* | 4/2018 | Tokunaga | B60R 25/24 |

\* cited by examiner

BIOMETRIC AUTHENTICATION FOR A VEHICLE WITHOUT PRIOR REGISTRATION

TECHNICAL FIELD

The present disclosure generally relates to vehicle fob-free entry and ignition and, more specifically, biometric authentication for a vehicle without prior registration.

BACKGROUND

Vehicles can be manufactured with different methods of entering a vehicle without a physical key. Some vehicles include a key-fob or smartphone based entry and ignition systems. Alternatively, Fob-free Entry and Ignition (FEI) systems facilitate unlocking a vehicle and enabling the ignition of the vehicle without a key, a key fob, or a smartphone. For example, a vehicle may have an external keypad into which a person enters a key code to unlock the doors and an internal keypad or touch screen in which the person enters a key code to enable the ignition.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for biometric authentication for a vehicle without prior registration. An example vehicle includes a biometric scanner to generate a biometric token and a body control module. The body control module, when the biometric token is authorized, enable an ignition switch. Additionally, when the biometric token is not authorized and an additional source of authorization is received, the body control module (a) tracks usage of the vehicle subsequent to receiving the biometric token, and (b) marks the biometric token as authorized when the usage satisfies a threshold.

An example method of controlling keyless entry and ignition of a vehicle includes generating a biometric token with a biometric scanner and when the biometric token is authorized, enabling an ignition switch. The example method also includes when the biometric token is not authorized and an additional source of authorization is received (a) tracking usage of the vehicle subsequent to receiving the biometric token, and (b) marking, in cryptographically secure memory, the biometric token as authorized when the usage satisfies a threshold.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
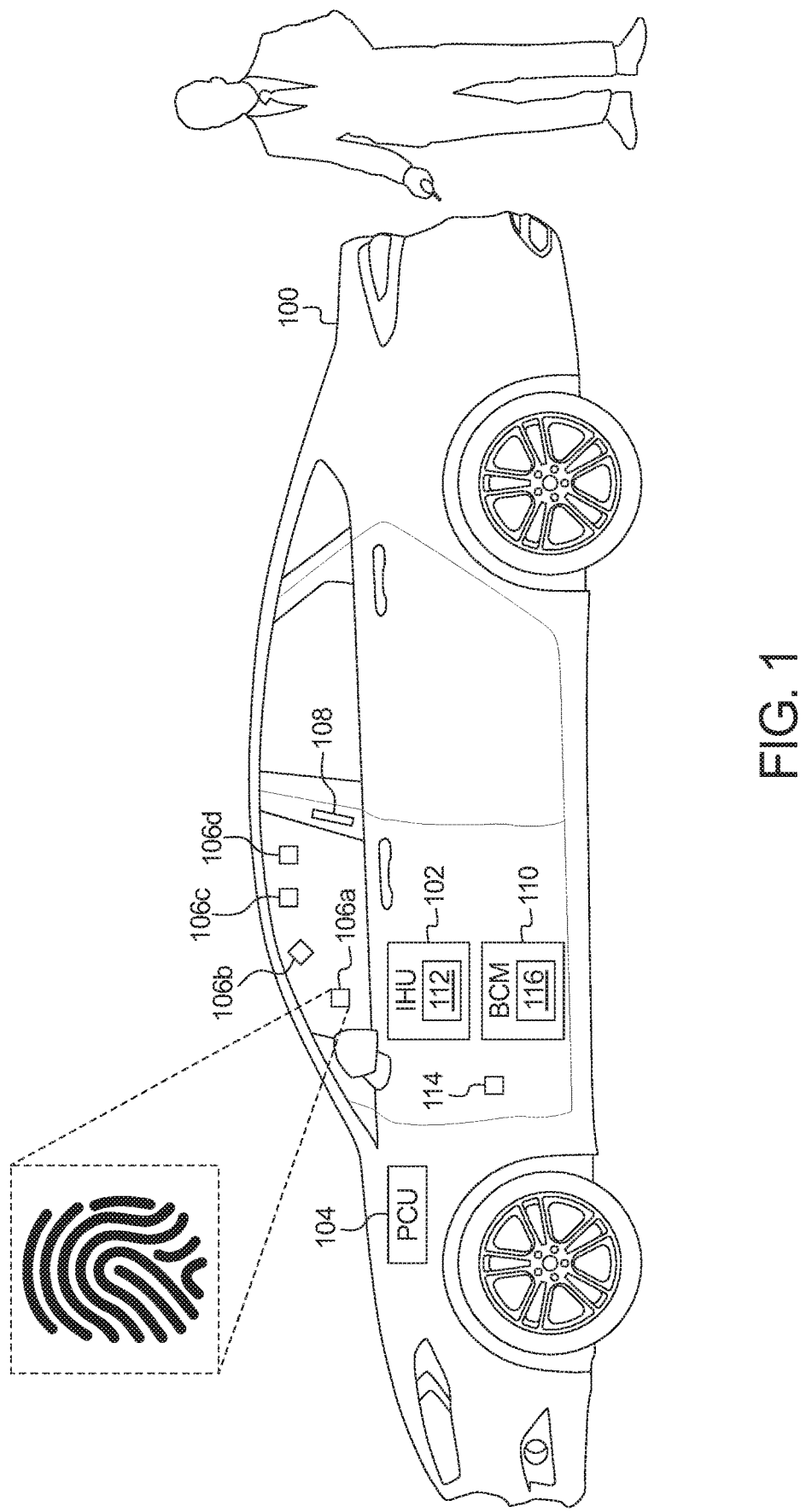
FIG. 1 illustrates a vehicle operating accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Fob-less Entry and Ignition (FEI) systems facilitate unlocking doors of a vehicle and enable the ignition of the vehicle without a physical key, key fob, or smartphone. Vehicles with FEI systems include one or more keypads on the exterior of the vehicle (e.g., near the B-pillar) into which a user enters a key code to unlock the door. Additionally, the vehicle includes a physical or soft (e.g., via a touch screen) keypad on the interior of the vehicle to enable the ignition switch. To prevent unauthorized access (e.g., by a child of a user of the vehicle that surreptitiously learns the key codes, etc.), some FEI systems include biometric authentication. Traditionally, with biometric authentication, the user is required to pre-register with a website or an application to generate a profile that associates the biometric token with an authorized user. This registration or enrollment process can introduce enough "sign up" friction to discourage use of the biometric authentication feature.

As disclosed below, a method of performing biometric authentication for a FEI system in a vehicle is provided without the user first completing a registration or enrollment process through a website or an application. A vehicle includes a keypad on the exterior of the vehicle and a touch screen on the interior of the vehicle. To unlock the door, a user puts a key code into the exterior keypad. The key code is a series of numeric or alphanumeric characters that are associated with an authorization to access the vehicle. In some examples, multiple key codes are associated with the unlocking the vehicle. In some such examples, the user enters a first key code to unlock the door without enabling biometric authentication of the ignition and enters a second key code to enable biometric authentication of the ignition. When the user is in the driver's seat, the user provides the biometric token (e.g., via a finger print scanner or an iris scanner, etc.). When the biometric token is associated with an authorized user, the vehicle enables the ignition switch. When the biometric token is not associated with an authorized user but (a) an authorized key fob or mobile device (e.g., smartphone, smart watch, etc.) is inside the vehicle and/or (b) the user enters an authorized key code into a soft keypad on the touch screen, the vehicle (i) enables the ignition switch and (ii) saves the biometric token to determine whether the biometric token should be considered authorized after the vehicle has been driven a threshold distance (e.g., 1 mile, 2 miles, etc.).

The vehicle designates the biometric token not considered as authorized as potential authorized biometric token. Over-time, when certain requirements are met, a potential authorized biometric token is converted into an authorized biometric token without further intervention by a user. A potential authorized biometric token is converted into an authorized biometric token when (a) the potential authorized biometric token has been used in conjunction with authorized key code or mobile device more than a threshold frequency (e.g., two times per week, etc.), (b) the vehicle has been driven after the potential authorized biometric token has been used in conjunction with authorized key code or mobile device for longer than a threshold cumulative period of time (e.g., one hour, two hours, etc.), and/or (c) the vehicle has been driven after the potential authorized biometric token has been used in conjunction with authorized key code or mobile device for greater than a threshold cumulative distance (e.g., 3 to 5 miles, etc.). In some examples, the user is presented a notification when the biometric token is authorized to inform them that biometric activated start is now available.

In some examples, when the biometric token is scanned, sensors inside the vehicle measure vital signs (e.g., heart rate and/or blood oxygen level) of the user. In some such examples, when the biometric token is a finger print, the finger print scanner includes a pulse oximeter or light emitting devices to measure blood oxygen level by analyzing the difference between visible and infrared light transmittance. If the blood oxygen saturation is lower than a threshold (e.g., 96%, etc.), the vehicle determines that there is a high likelihood that the user is not alive and does not enable the ignition switch. In some examples, the pulse oximeter measures the heart rate of the user. In such examples, the vehicle determines that there is a high likelihood that the user is either not alive or is under duress when the heart rate of the user is not within a threshold range (e.g., 50 to 100 beats per minute) and does not enable the ignition switch.

As described above, the vehicle maintains a database in secure memory of biometric tokens that are authorized and biometric tokens that are potentially authorized. In some examples, the vehicle erases biometric tokens that are potentially authorized after a certain period of time (e.g., one week, one month, etc.) of the potentially authorized biometric tokens not being detected by the biometric scanner. In some examples, the database also includes previously authorized biometric tokens that were once authorized, but designated as previously authorized after a certain period of time (e.g., one week, one month, etc.) of the authorized biometric tokens not being detected by the biometric scanner. In some such examples, upon detection of the de-authorized biometric token with a secondary authorization method (e.g., the presence of the key fob, entry of the key code, etc.), the de-authorized biometric token is designated as an authorized biometric token. In some examples, the vehicle completely erases the authorized biometric tokens and the potentially authorized biometric tokens from the secure memory as a security response. In some such examples, the vehicle completely erases the biometric tokens stored in the secure memory when (i) the vehicle determines that the user is either not alive or is under duress, (ii) the user enters a particular key code into one of the keypads, or (iii) the non-authorized biometric token is scanned by the biometric scanner a threshold number of times without the authorized key code or mobile device. Additionally, in some examples, the vehicle alarm system may be also triggered in these events.

FIG. 1 illustrates a vehicle 100 operating in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example, the vehicle 100 includes an infotainment head unit (IHU) 102, a powertrain control unit (PCU) 104, one or more interior or exterior biometric scanner(s) 106a-106d, an exterior keypad 108, and a body control unit (BCM) 110.

The infotainment head unit 102 provides an interface between the vehicle 100 and a user. The infotainment head unit 102 includes digital and/or analog interfaces (e.g., input devices and output devices) to receive input from the user(s) and display information. The input devices include a touch screen 112 capable of presenting a soft keypad to user. The input devices may also include, for example, a control knob, an instrument panel, buttons, and/or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In some examples, the touch screen 112 is incorporated into the center console display. In the illustrated example, the infotainment head unit 102 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 102 displays the infotainment system on, for example, the center console display.

The powertrain control unit 104 includes hardware and firmware to control the ignition, fuel injection, emission systems, transmission and/or the brake system of the vehicle 100. The powertrain control unit 104 also monitors sensors (such as fuel injection sensors, wheel speed sensors, exhaust sensors, etc.) and uses control algorithms to control, for example, fuel mixture, ignition timing, variable cam timing, emissions control, a fuel pump, an engine cooling fan and/or a charging system. In the illustrated example, the powertrain control unit 104 sends messages via a vehicle data bus (e.g., via the vehicle data bus 204 of FIG. 2 below) regarding distance the vehicle 100 has driven. Additionally, the powertrain control unit 104 controls an immobilizer 114 that prevents the engine from running unless an authorized token is presented. The powertrain control unit 104 also enables and disables a keyless ignition switch that a driver useless to start the engine of the vehicle without a key. For example, the keyless ignition switch may be a button or switch located on the dashboard proximate the steering wheel.

The biometric scanner(s) 106a-106d measure characteristics inherent to the user to create a unique biometric token based on that characteristic (e.g., using a histogram algorithm, a checksum algorithm, etc.). The biometric scanner(s) 106a-106d may include one or more of a fingerprint scanner 106a, a microphone 106b, a camera 106c, and/or an infrared camera 106d. The biometric scanner(s) 106a-106d may be placed such they allow external or internal acquisition of a biometric token from the user. In some cases, biometric scanner(s) 106a-106d may be mounted in the cabin but directed outside to capture biometric information for users seeking entry to the cabin. For example, biometric scanner(s) 106a-106d may be mounted on the side of the driver's seat, the side of the overhead panel, side of the center mirror, or use a portion of the cabin glass as part of the sensing element. The fingerprint scanner 106a images a fingerprint of a user and converts the information obtained from the image into a substantially unique numeric value for the biometric token. In some examples, the fingerprint scanner 106a is positioned on the ignition switch. In some examples, the fingerprint scanner 106a includes a display that displays an image of a fingerprint that changes color depending on the status of the corresponding biometric token (e.g., red for an unauthorized user, yellow for a potentially authorized user, green for an authorized user, etc.). Additionally or alternatively, in some examples, the fingerprint scanner 106a includes a pulse oximeter to measure the heart rate and/or blood oxygen saturation level of the user. The microphone 106b measures the voice of the user to perform voice recognition (sometimes referred to as "speaker recognition") to generate the biometric token. The camera(s) 106c and 106d capture images for generating the biometric token using facial and/or iris recognition. In some examples, the biometric scanner(s) 106a-106d (a) is/are communicatively coupled to the body control module 110 via a dedicated data bus (e.g., a data bus that does not communicatively couple with other components of the vehicle 100) and/or (b) communicate(s) with the body control module 110 using encryption.

The exterior keypad 108 is communicatively coupled to the body control module 110. The exterior keypad 108 includes numeric or alphanumeric buttons. In some examples, the buttons are tilt push buttons that indicate one value when pressure is applied to one side of the button and indicate a different value when pressure is applied to the opposite side of the button. Alternatively, in some examples, the buttons may be capacitive touch, piezoelectric, or resistive touch-based buttons. In the illustrated example, the exterior keypad 108 is located on a door of the vehicle 100 proximate the B-pillar. The exterior keypad 108 may be located elsewhere on the vehicle 100, such as proximate a door handle or on the edge of the windshield.

In some examples, the exterior keypad 108 is an ultraviolet (UV) keypad. The UV keypad is scribed or projected onto a UV absorbent or reflective material positioned between two or more layers of material that make up the window. When a driver puts his or her finger on the keypad to enter the key code, a camera captures light reflected off a finger, such that key presses can be determined. Alternatively or additionally, in some examples, the camera associated with the exterior keypad 108 performs facial and/or iris detection to generate the biometric token to authorize the driver to enter the vehicle 100. In some such examples, the biometric token is used to unlock the door when the biometric token is authorized. Examples of using the UV keypad as the exterior keypad are described in U.S. patent application Ser. No. 15/683,375, entitled "Vehicle Unlocking Systems, Devices, and Methods," filed Aug. 22, 2017, which is incorporated by reference in its entirety.

The body control module 110 controls various subsystems of the vehicle 100. For example, the body control module 110 may control power windows, power locks, and/or power mirrors, etc. The body control module 110 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. In the illustrated example, the body control module 110 includes an ignition authenticator 116.

The ignition authenticator 116 (a) unlocks the door(s) when an authorized key code is entered into the exterior keypad 108, (b) manages a database of authorized and potentially authorized biometric tokens, (c) enables the immobilizers 114 and the ignition switch when an authorized biometric token is received, and (d) enables the immobilizers 114 and the ignition switch when an authorized key code is entered into the touch screen 112 of the infotainment head unit 102. When a key code is entered into the exterior keypad 108, the ignition authenticator 116 compares the entered key code to a list of authorized key codes store in secure memory (e.g., the secure memory 212 of FIG. 2 below). The ignition authenticator 116 unlocks the door(s) of the vehicle 100 when the entered key code matches one of the authorized key codes stored in the secure memory. In some examples, the key codes stored in the secure memory are associated with different functions. In some such examples, some key codes are associated with standard access and some key codes are associated with biometric access. With the key codes associated with standard access, the ignition authenticator 116 unlocks the door, but disables enabling the ignition button with a biometric token. With the key codes associated with biometric access, the ignition authenticator 116 unlocks the door and enables enabling the ignition button with a biometric token. In some examples, when a key code not associated with biometric access is entered into the exterior keypad 108, the ignition authenticator 116 enables enabling the ignition button with a biometric token when (a) a key code associated with biometric access is entered into the soft keypad on the touch screen 112, or (b) an authorized key fob and/or mobile device is inside the vehicle 100.

When enabling the ignition button with a biometric token is enabled, the ignition authenticator 116 enables the ignition switch upon receiving an authorized biometric token via the biometric scanner 106a-106d. To determine whether the received biometric token is authorized, the ignition authenticator 116 compares the received biometric token to the authorized biometric tokens stored in the secure memory. When the biometric token is not authorized but enabling the ignition button with a biometric token is enabled, the ignition authenticator 116 creates or updates a record stored in the secure memory that associates the biometric token with being potentially authorized. When the biometric token is not authorized and enabling the ignition button with a biometric token is disabled, the ignition authenticator 116 does not enable the ignition switch.

The ignition authenticator 116 tracks, via the corresponding record, information regarding the vehicle 100 when the ignition is started after a potentially authorized biometric token is received. In some examples, the ignition authenticator 116 tracks the frequency that the potentially authorized biometric token has been received. In some examples, the ignition authenticator 116 tracks the cumulative time that the vehicle 100 has been driven after receiving the potentially authorized biometric token. For example, if on a first trip, the vehicle 100 was driven for 30 minutes after receiving the potentially authorized biometric token and on a second trip, the vehicle 100 was driven for 15 minutes after receiving the potentially authorized biometric token, the record associated with the potentially authorized biometric token may indicate that the vehicle has been driven for 45 minutes. In some such examples, the ignition authenticator 116 only tracks time for which the vehicle 100 is driven more than a threshold duration (e.g., one minute, etc.) and/or when the vehicle 100 is driven more than a threshold distance (e.g., one mile, etc.). In some examples, the ignition authenticator 116 tracks the cumulative distance that the vehicle 100 has been driven after receiving the potentially authorized biometric token.

For example, on a first trip, if the vehicle 100 was driven 5 miles after receiving the potentially authorized biometric token and on a second trip, the vehicle 100 was driven for 20 miles after receiving the potentially authorized biometric token, the record associated with the potentially authorized biometric token may indicate that the vehicle has been driven for 25 miles. In some such examples, the ignition authenticator 116 only tracks distance for which the vehicle 100 is driven more than a threshold duration (e.g., one minute, etc.) and/or when the vehicle 100 is driven more than a threshold distance (e.g., one mile, etc.).

From time to time, without user intervention to do so, the ignition authenticator 116 either deletes a record associated with a potentially authorized biometric token or transforms the record to associate the biometric token as being authorized. The ignition authenticator 116 deletes the record when the corresponding biometric token has not been received from the biometric scanner 106a-106d for a threshold period of time. For example, the ignition authenticator 116 may delete a record when the corresponding biometric token has not been received from the biometric scanner 106a-106d for over a week. In some examples, this time based deletion of the biometric tokens is suspended when the vehicle has been placed in certain operational modes, such as an airport mode or long term storage mode. The ignition authenticator 116 transforms the potentially authorized record into an authorized record when (a) the potential authorized biometric token has been used in conjunction with authorized key code or mobile device more than a threshold frequency (e.g., two times per week, etc.), (b) the vehicle 100 has been driven after the potential authorized biometric token has been used in conjunction with authorized key code or mobile device for longer than a threshold cumulative period of time (e.g., one hour, two hours, etc.), and/or (c) the vehicle 100 has been driven after the potential authorized biometric token has been used in conjunction with authorized key code or mobile device for greater than a threshold cumulative distance (e.g., 3 to 5 miles, etc.).

In some examples, the ignition authenticator 116 monitors the heart rate and/or blood oxygen level (e.g., via the pulse oximeter in the fingerprint scanner 106a) when the biometric scanner 106a-106d measures the biometric characteristic of the driver. In such examples, the ignition authenticator 116 will not enable the ignition switch and will disable the immobilizer 114 when the ignition authenticator 116 determines that the user is not alive or is under duress. When the blood oxygen saturation is lower than a threshold (e.g., 85%, etc.), the ignition authenticator 116 determines that the user is not alive. The ignition authenticator 116 determines that there the user is either not alive or is under duress when the heart rate of the user is not within a threshold range (e.g., 50 to 90 beats per minute).

In some examples, the ignition authenticator 116 erases the record of all of the biometric tokens as an emergency response to detecting an emergency event. In some such examples, the emergency events include when (i) the user is either not alive or is under duress, (ii) a particular key code associated with emergency events (sometime referred to as a "panic code") into one of the keypads (e.g., the exterior keypad 108 or the soft keypad on the touch screen 112), or (iii) the non-authorized biometric token is scanned by the biometric scanner a threshold number of times. Alternatively, in some examples, the ignition authenticator 116, in response to detecting an emergency, disables the biometric authentication until an authorized key fob is detected inside the vehicle 100 and/or a recovery key code is entered into the internal keypad. Alternatively or additionally, in some examples the ignition authenticator 116 will first issue a telematics request to the vehicle owner or admin advising of the detected condition or threat and inquiring if the codes should be erased. Alternatively or additionally, in some examples, the ignition authenticator 116, in response to detecting an emergency, triggers an alarm (e.g., activate the horn, etc.). In some such examples, the ignition authenticator 116 facilitates the driver enabling and disabling the alarm being tied to biometric authentication via the center console display of the infotainment head unit 102. Alternatively or additionally, in some examples the ignition authenticator 116 may suspend triggering of the alarm if vehicle location is known to be in municipalities that have ordnances against audible alarms.

Figure 2:
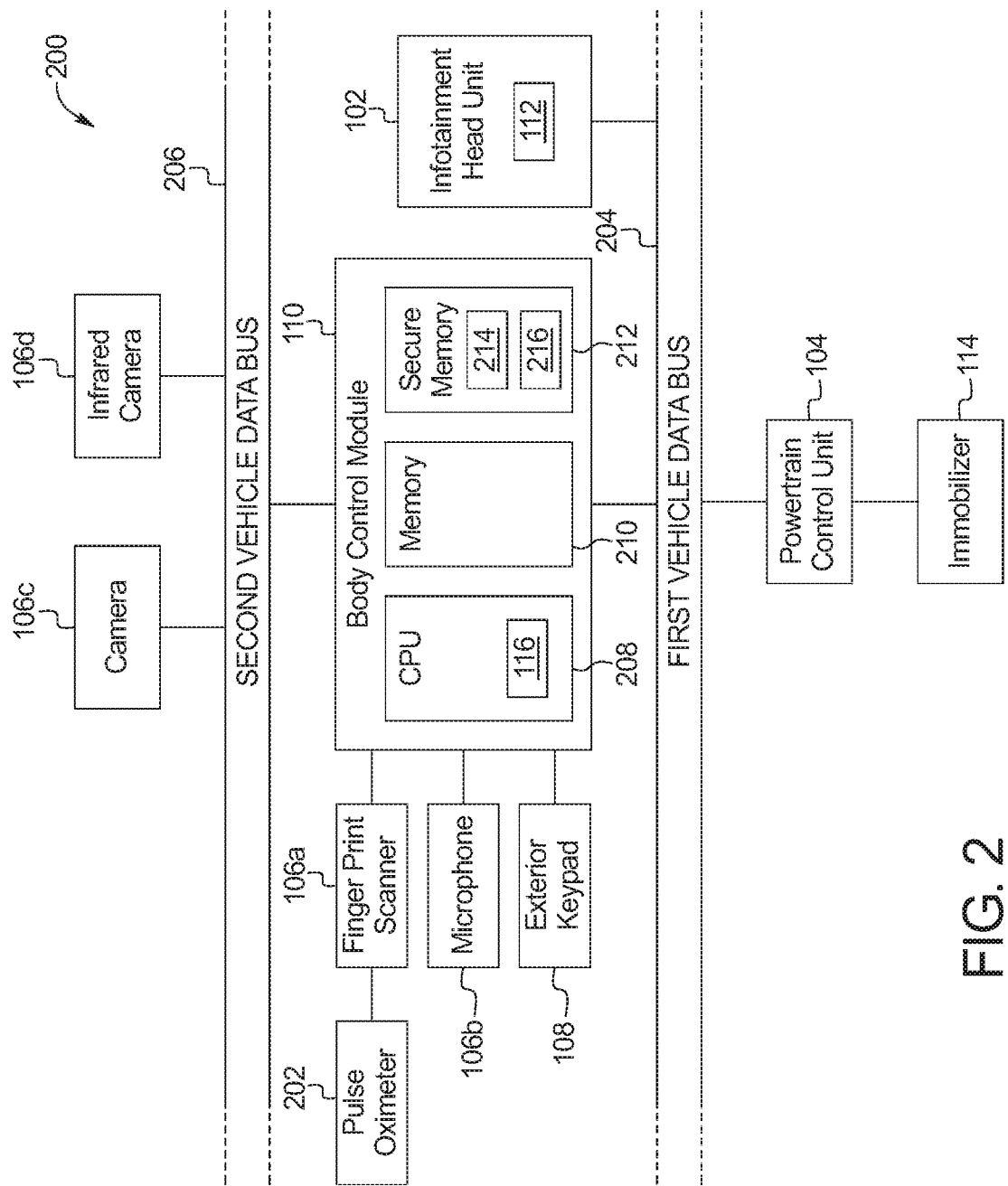
FIG. 2 is a block diagram of electronic components of the vehicle of FIG. 1.

FIG. 2 is a block diagram of electronic components 200 of the vehicle 100 of FIG. 1. In the illustrated example, the electronic components 200 include the infotainment head unit 102, the powertrain control unit 104, the biometric scanners 106a-106d, the exterior keypad 108, the body control module 110, the immobilizer 114, the pulse oximeter 202, the first vehicle data bus 204, and the second vehicle data bus 206.

In the illustrated example, the body control module 110 includes a processor or controller 208, memory 210, and secure memory 212. In the illustrated example, the body control module 110 is structured to include ignition authenticator 116. The processor or controller 208 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 210 and 212 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 210 includes multiple kinds of memory, particularly volatile memory and non-volatile memory.

The secure memory 212 (sometimes referred to as "cryptomemory") includes an embedded hardware encryption engine with its own authentication keys to securely store information. The cryptographic algorithm of the hardware encryption engine encrypts data stored in the secure memory 212. The secure memory 212 are communicatively coupled via a dedicated data bus. The processor or controller 208 isolates data it retrieves from the secure memory 212 so that that data is not accessible to other hardware in the vehicle 100. In the illustrated example, the key codes 214 and the records 216 of the authorized and potentially authorized biometric tokens are stored in the secure memory 212.

The memory 210 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 210, the computer readable medium, and/or within the processor 208 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

In the illustrated example, the first vehicle data bus 204 communicatively couples the infotainment head unit 102, the powertrain control unit 104, and the body control module 110. In some examples, the first vehicle data bus 204 is implemented in accordance with the controller area network (CAN) bus protocol as defined by International Standards Organization (ISO) 11898-1. Alternatively, in some examples, the first vehicle data bus 204 may be a Media Oriented Systems Transport (MOST) bus, or a CAN flexible data (CAN-FD) bus (ISO 11898-7). The second vehicle data bus 206 communicatively couples the cameras 106c and 106d and the body control module 110. The second vehicle data bus 206 may be a MOST bus, a CAN-FD bus, or an Ethernet bus. In some examples, the body control module 110 communicatively isolates the first vehicle data bus 204 and the second vehicle data bus 206 (e.g., via firewalls, message brokers, etc.).

Figure 3:
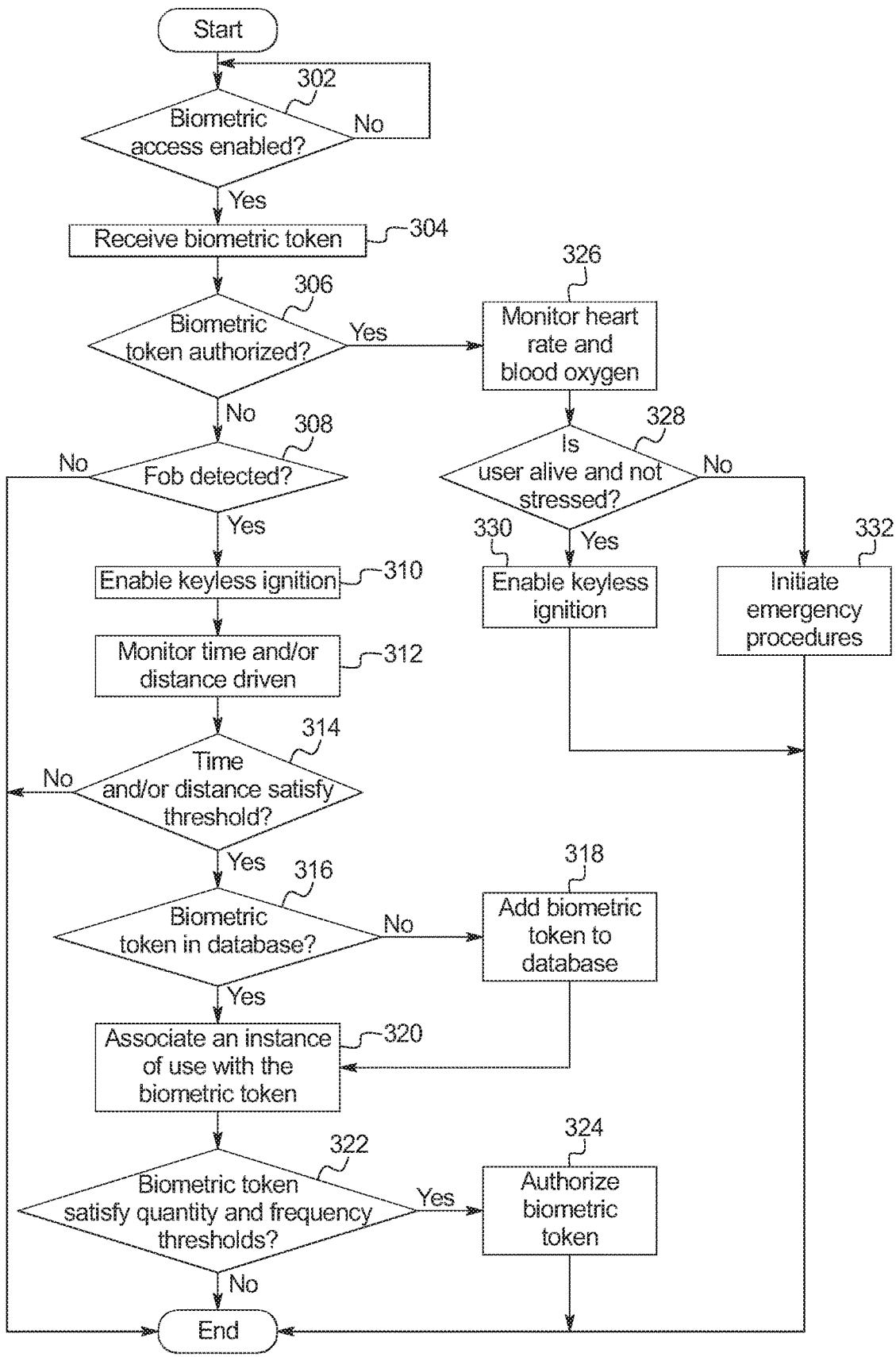
FIG. 3 is a flowchart of a method to provide secondary factor authentication for a fob-less entry and ignition system, which may be implemented by the electronic components of FIG. 2.

FIG. 3 is a flowchart of a method to provide secondary factor authentication for a fob-less entry and ignition system, which may be implemented by the electronic components 200 of FIG. 2. Initially, at block 302, the ignition authenticator 116 waits until the ignition via a biometric token is enabled. In some example, the ignition via a biometric token is enabled when a key code associated with biometric access is entered on the exterior keypad 108 or the soft keypad on the touch screen 112. At block 304, the biometric token is received or otherwise retrieved from the biometric scanner 106a-106d. At block 306, the ignition authenticator 116 determine whether the biometric token is authorized. When the biometric token is authorized, the method continues at block 326. Otherwise, then the biometric token is not authorized, the method continues at block 308.

At block 308, the ignition authenticator 116 determines whether an authorized key fob or mobile device is detected. When the authorized key fob or mobile device is detected, the method continues to block 310. At block 310, the ignition authenticator 116 enables the ignition switch. At block 312, the ignition authenticator 116 monitors the time and/or distance that the vehicle 100 is driven. At block 314, the ignition authenticator 116 determines whether the time and/or distance satisfies (e.g., is greater than) a corresponding threshold. When the time and/or distance satisfy the corresponding threshold, the method continues to block 316.

At block 316, the ignition authenticator 116 determines whether the biometric token is in the database stored in secure memory 212. When the biometric token is not in the database, the method continues to block 318. Otherwise, when the biometric token is in the database, the method continues at block 320. At block 318, the ignition authenticator 116 creates a record associated with the biometric token in the database. At block 320, the ignition authenticator 116 adds the usage statistics of the current driving session to the record associated with the biometric token. At block 322, the ignition authenticator 116 determines whether the usage statistics associated with the biometric token satisfy usage quantity (e.g., time driven, distance driven, etc.) and/or usage frequency thresholds. At block 324, when the usage statistics associated with the biometric token satisfy usage quantity and/or usage frequency thresholds, the ignition authenticator 116 associates the biometric token with being authorized.

At block 326, the ignition authenticator 116 monitors the heart rate and/or blood oxygen level of the user via the biometric scanner 106a-106d and/or other sensors in the vehicle 100. At block 328, the ignition authenticator 116 determines whether the user is alive and not stressed. At block 330, when the driver is alive and not stressed, the ignition authenticator 116 enables the ignition switch. At block 332, when the driver is not alive and/or is stressed, the ignition authenticator 116 initiates emergency procedures. For example, the ignition authenticator 116 may wipe the biometric tokens from the database, contact the vehicle owner/admin, and/or contact law enforcement authorities.

The flowchart of FIG. 3 is representative of machine readable instructions stored in memory (such as the memory 210 of FIG. 2) that comprise one or more programs that, when executed by a processor (such as the processor 208 of FIG. 2), cause the vehicle 100 to implement the example ignition authenticator 116 and/or more generally the body control module 110 of FIGS. 1 and 2. Further, although the example program(s) is/are described with reference to the flowchart illustrated in FIG. 3, many other methods of implementing the example ignition authenticator 116 and/or more generally the body control module 110 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a biometric scanner to generate a first biometric token; and
   a body control module comprising a processor, wherein the body control module is configured to:
   determine that the first biometric token is associated with a first authorized user;

determine, based on the first biometric token being associated with the first authorized user, that the first biometric token is authorized to enable an ignition switch;

before enabling the ignition switch, measure one or more vital signs of the first authorized user with the biometric scanner; and disable, based on the one or more vital signs indicating that the first authorized user is either not alive or is stressed, the biometric scanner until an additional source of authorization is received at the body control module.

2. The vehicle of claim 1, further comprising an external keypad and an internal keypad, and wherein the body control module is further configured to determine a first key code entered into one of the external keypad or the internal keypad.

3. The vehicle of claim 2, wherein the body control module is further configured to:

determine that the additional source of authorization comprises the first key code;

unlock a door of the vehicle based on determining that the additional source of authorization has been received at the body control module;

determine that a second key code different from the first key code is entered in the external keypad or the internal keypad; and unlock the door of the vehicle without determining that the additional source of authorization has been received based on the second key code being received at the body control module.

4. The vehicle of claim 1, wherein:

the biometric scanner generates a second biometric token, and wherein the body control module is further configured to:

determine the second biometric token is not associated with the first authorized user;

receive the additional source of authorization at the body control module;

track a measure of usage of the vehicle subsequent to receiving the additional source of authorization at the body control module;

determine the second biometric token is associated with a second authorized user based on both the measure of usage satisfying a usage threshold and receiving the additional source of authorization at the body control module; and store the second biometric token in a cryptographically secure memory.

5. The vehicle of claim 1, wherein the body control module is further configured to determine that the additional source of authorization has been received at the body control module, the additional source of authorization comprising an authorized key fob being detected within a distance threshold of a key fob detector of the vehicle.

6. The vehicle of claim 1, wherein the body control module is further configured to:

measure one or more second vital signs of the first authorized user with the biometric scanner; and enable the ignition switch based on the one or more second vital signs being indicative of the first authorized user being alive and not stressed.

7. The vehicle of claim 1, wherein the body control module is further configured to erase all biometric tokens from a cryptographically secure memory.

8. The vehicle of claim 1, wherein the body control module is further configured to send an alert or message to a mobile device.

9. The vehicle of claim 1, wherein the one or more vital signs comprise a heart rate of the first authorized user.

10. The vehicle of claim 1, wherein the biometric scanner is a fingerprint scanner and the first biometric token is a numeric representation of a fingerprint.

11. The vehicle of claim 4, wherein the measure of usage is either a cumulative distance the vehicle travels after the body control module receives the second biometric token or a cumulative time the vehicle is driven after the body control module receives the second biometric token.

12. The vehicle of claim 1, wherein the biometric scanner is a camera associated with an ultraviolet keypad, and the first biometric token is a numeric representation of facial features of a user captured by the camera.

13. A method of controlling keyless entry and ignition of a vehicle, comprising:

generating a first biometric token with a biometric scanner;

determining, with a processor, that the first biometric token is associated with a first authorized user;

determining, based on the first biometric token being associated with the first authorized user, that the first biometric token is authorized to enable an ignition switch;

before enabling the ignition switch, measuring one or more vital signs of the first authorized user with the biometric scanner; and disabling, with the processor, the biometric scanner until an additional source of authorization is received at the processor based on the one or more vital signs indicating that the first authorized user is either not alive or is stressed.

14. The method of claim 13, further comprising receiving at the processor, via one of an external keypad or an internal keypad, a first key code as the additional source of authorization.

15. The method of claim 13, further comprising determining that the additional source of authorization is received at the processor based on detecting an authorized key fob within a distance threshold of a key fob detector of the vehicle.

16. The method claim 13, further comprising:

generating a second biometric token with the biometric scanner;

determining, with the processor, that the second biometric token is not associated with the first authorized user;

receiving, with the processor, the additional source of authorization;

tracking, with the processor, a measure of usage of the vehicle subsequent to receiving the additional source of authorization at the processor; and storing, in a cryptographically secure memory, the second biometric token as associated with a second user authorized based on both the measure of usage satisfying a usage threshold and receiving the additional source of authorization at the processor.

17. The method of claim 13, further comprising:

measuring one or more second vital signs of the first authorized user with the biometric scanner; and enabling the ignition switch based on the one or more vital signs being indicative of the first authorized user being alive and not stressed.

18. The method of claim 13, further comprising erasing all biometric tokens from a cryptographically secure memory and not enabling the ignition switch when the measured one or more vital signs of the first authorized user indicates that the first authorized user is either not alive or is stressed.

19. The method of claim 13, further comprising:
sending, by the processor, an alert or message to a memory of a mobile device and not enabling the ignition switch when the measured one or more vital signs of the first authorized user indicates that the first authorized user is either not alive or is stressed; and
enabling the ignition switch when a confirmation message sent from the mobile device is received at the processor.

20. The method of claim 16, wherein tracking the measure of usage of the vehicle subsequent to receiving the second biometric token at the processor comprises either or both of (i) a cumulative time the vehicle is driven after the processor receives the second biometric token or (ii) a cumulative distance the vehicle travels after the processor receives the second biometric token.

\* \* \* \* \*